US011214121B2

(12) United States Patent
Bourqui

(10) Patent No.: US 11,214,121 B2
(45) Date of Patent: Jan. 4, 2022

(54) METHOD OF MAINTAINING A POSITION OF AN AIRFLOW-DIRECTION CONTROL ELEMENT OF A HVAC SYSTEM

(71) Applicant: Johnson Electric S.A., Murten (CH)

(72) Inventor: Yvan Bourqui, Corminboeuf (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 183 days.

(21) Appl. No.: 15/442,088

(22) Filed: Feb. 24, 2017

(65) Prior Publication Data

US 2017/0246932 A1    Aug. 31, 2017

(30) Foreign Application Priority Data

Feb. 25, 2016 (GB) .................................... 1603284

(51) Int. Cl.
*B60H 1/00* (2006.01)
*B60H 1/34* (2006.01)

(52) U.S. Cl.
CPC ..... *B60H 1/00871* (2013.01); *B60H 1/00857* (2013.01); *B60H 1/3414* (2013.01); *B60H 2001/3471* (2013.01)

(58) Field of Classification Search
CPC ............ B60H 1/00871; B60H 1/00857; B60H 1/3414; B60H 2001/3471; B60H 2001/3478; B60H 1/00835; B60H 1/345
USPC .......................................................... 454/75
See application file for complete search history.

(56) References Cited

U.S. PATENT DOCUMENTS

| 3,242,652 A * | 3/1966 | Emil | F24C 15/20 169/19 |
| 4,210,429 A * | 7/1980 | Golstein | A61L 9/20 422/121 |
| 4,483,316 A * | 11/1984 | Fritz | F24C 15/20 126/299 D |
| 4,749,930 A * | 6/1988 | Faville | G05B 19/4166 318/685 |
| 5,704,955 A * | 1/1998 | Giles | B01D 46/0005 55/422 |

(Continued)

FOREIGN PATENT DOCUMENTS

| CN | 1100193 A | 3/1995 |
| CN | 1987261 A | 6/2007 |

(Continued)

*Primary Examiner* — Kenneth J Hansen
*Assistant Examiner* — Ryan L Faulkner
(74) *Attorney, Agent, or Firm* — Muncy, Geissler, Olds & Lowe, P.C.

(57) ABSTRACT

A method of maintaining a position of an airflow-direction control element 16 of a HVAC system, comprising the steps of, a] determining a position of at least one movable member of an airflow-direction control mechanism of the HVAC system; and b] calculating whether the movable member is at a target position associated with a required position of the airflow-direction control element, and if not, activating an airflow-direction-controller actuator of the HVAC system to effect a change in the position of the movable member thereby bringing the airflow-direction control element to or towards the said required position. A HVAC system suitable for implementing such a method is also provided and capable of improving the overall efficiency of operation.

16 Claims, 2 Drawing Sheets

(56) References Cited

U.S. PATENT DOCUMENTS

| | | | | |
|---|---|---|---|---|
| 6,208,497 | B1* | 3/2001 | Seale | F01L 9/04 361/154 |
| 6,347,626 | B1* | 2/2002 | Yi | F24C 15/20 126/299 D |
| 6,878,195 | B2* | 4/2005 | Gibson | A61L 9/20 422/121 |
| 8,764,529 | B2* | 7/2014 | Cook | F16K 1/165 454/256 |
| 9,335,057 | B2* | 5/2016 | Bagwell | F15D 1/02 |
| 9,494,324 | B2* | 11/2016 | Livchak | F24C 15/2021 |
| 2001/0043450 | A1* | 11/2001 | Seale | F01L 9/04 361/160 |
| 2001/0055947 | A1* | 12/2001 | McCabe | A62C 2/14 454/369 |
| 2006/0048525 | A1* | 3/2006 | Cook | F24F 13/1426 62/131 |
| 2006/0286919 | A1* | 12/2006 | Han | B60H 1/00849 454/162 |
| 2008/0051024 | A1* | 2/2008 | Caliendo | A62C 2/14 454/369 |
| 2009/0141061 | A1* | 6/2009 | Jacobson | G05B 19/232 347/16 |
| 2010/0190428 | A1* | 7/2010 | Horner | B64D 13/02 454/74 |
| 2010/0240291 | A1* | 9/2010 | Tanner | B64D 13/02 454/72 |
| 2012/0009859 | A1* | 1/2012 | Wijaya | B60H 1/00764 454/75 |
| 2013/0141031 | A1* | 6/2013 | Yamada | G05B 19/23 318/603 |
| 2014/0097784 | A1 | 4/2014 | Hart | |
| 2016/0341439 | A1* | 11/2016 | Karamanos | G05D 7/0635 |
| 2017/0045255 | A1* | 2/2017 | Karamanos | G05D 7/0635 |
| 2017/0246932 | A1* | 8/2017 | Bourqui | B60H 1/00871 |

FOREIGN PATENT DOCUMENTS

| | | |
|---|---|---|
| CN | 101506747 A | 8/2009 |
| CN | 103731074 A | 4/2014 |
| JP | 2004139656 A | 5/2004 |

* cited by examiner

METHOD OF MAINTAINING A POSITION OF AN AIRFLOW-DIRECTION CONTROL ELEMENT OF A HVAC SYSTEM

CROSS REFERENCE TO RELATED APPLICATIONS

This non-provisional patent application claims priority under 35 U.S.C. § 119(a) from Patent Application No. GB1603284.9 filed in British on Feb. 25, 2016, the entire contents of which are hereby incorporated by reference.

FIELD OF THE INVENTION

The present invention relates to a method of maintaining a position of an airflow-direction control element of a heating, ventilation, and air conditioning (HVAC) system, particularly without the use of an airflow-direction-controller actuator holding current. A HVAC system suitable for implementing such a method is also provided.

BACKGROUND OF THE INVENTION

HVAC systems are used for climate control, such as in motor vehicles. Such HVAC systems utilise vent flaps which can control a flow of air into or through an area to effect the climate control. The positions of the vent flaps are typically controlled by one or more actuators, positioning the vent flaps so as to alter an air flow emergent from the HVAC system.

Generally, each such actuator is formed having an electric motor adapted to control a gear chain. The gear chain is then generally directly or indirectly connected to levers which interact with the vent flaps, such that the actuation of the actuator can be transmitted to effect positional change of the vent flaps.

In order to maintain a given vent flap position when using such an electric motor, a holding current must be passed through the circuit in order to prevent deactivation of the force provided by the motor from causing the vent flaps to relax or be urged into an incorrect position, such as by wind or vibration. Such movement of the vent flaps may also be a result of mechanical play in the system which is overcome when the electric motor is in an activated condition. This holding current therefore reduces the efficiency of the HVAC systems.

As an alternative, a mechanically irreversible actuator could be used, such that a torque on an output gear of the actuator does not move the motor even when unpowered. A worm gear, for instance, could be used for such an application. However, mechanically irreversible gear trains have very low efficiency, and therefore there is an increased power consumption on the actuator. A high efficiency gear train increases the likelihood that vibrations or force will change the motor position and therefore vent flap position, hence the need for a holding current.

SUMMARY OF THE INVENTION

The present invention seeks to provide a method and a HVAC system capable of performing said method and capable of overcoming or obviating the above-referenced problems.

According to a first aspect of the invention, the present invention provides one method of maintaining a position of an airflow-direction control element of a HVAC system, comprising the steps of: a] determining a position of at least one movable member of an airflow-direction control mechanism of the HVAC system; b] calculating whether the movable member is at a target position associated with a required position of the airflow-direction control element, and if not, activating an airflow-direction-controller actuator of the HVAC system to effect a change in the position of the movable member thereby bringing the airflow-direction control element to or towards the said required position.

The present invention provides another method of maintaining a position of an airflow-direction control element of a HVAC system, comprising the steps of: a] determining a position of at airflow-direction control element of the HVAC system; b] determining whether the airflow-direction control element has been moved in the case of without being driven by an airflow-direction-controller actuator of the HVAC system; if yes, providing a current to a drive mechanism of the airflow-direction-controller actuator to change the position of the airflow-direction control element; if not, no current is provided to the drive mechanism of the airflow-direction-controller actuator.

According to a second aspect of the invention, the present invention provides a HVAC system comprising: an airflow-direction-controller actuator; a movable member arranged to be actuated by the actuator, the movable member including an airflow-direction control element; an actuator position sensor associated with the airflow-direction-controller actuator; and a controller associated with the actuator position sensor and arranged to feedback control a position of the movable member based on the measurements received from the actuator position sensor.

The HVAC system implementing the above method without having to provide a constant strong holding current to maintain a position of the movable member, and hence is capable of improving the overall efficiency of operation.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

Figure 1:
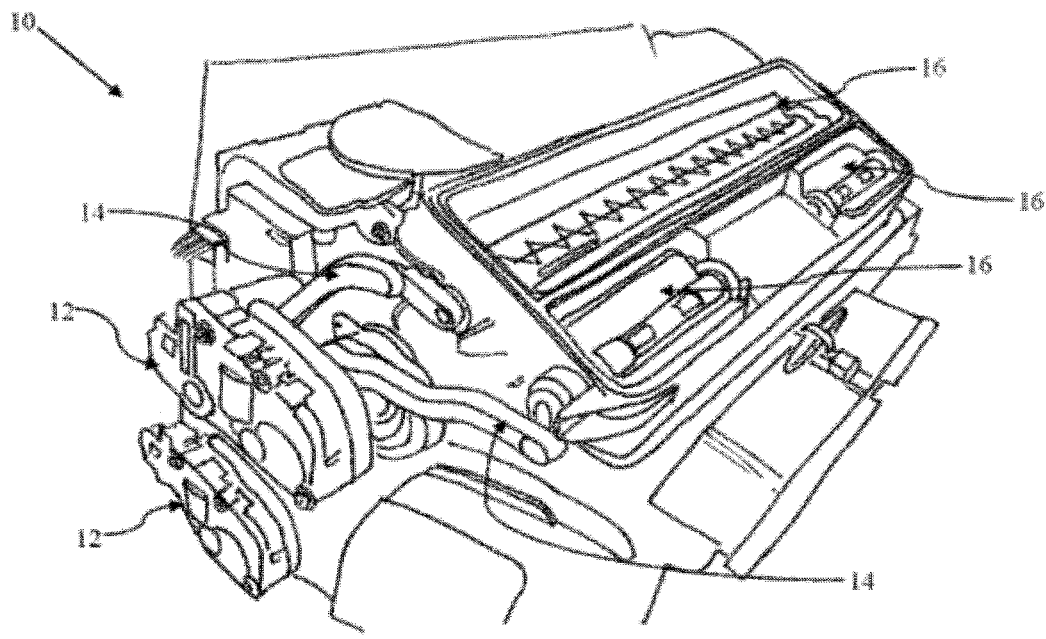
FIG. 1 shows a perspective representation of the preferred embodiment of part of a HVAC system in accordance with the second aspect of the invention.

Referring firstly to FIG. 1, there is shown a HVAC system globally at 10 which is arranged to substantially reduce the noise output thereof. The HVAC system 10 is part of a climate control system of a motor vehicle, though it will be appreciated that the present invention could potentially be utilised in any context in which a HVAC system is utilised.

The HVAC system 10 includes at least one airflow-direction-controller actuator 12; here two actuators 12 are shown, which may be singularly or separately controllable, though it will be apparent that any number of actuators could be supplied, depending upon the requirements of the HVAC system 10. Each actuator 12 is in communication with at least one connector, such as the levers 14 illustrated, which are in turn associated with at least one airflow-direction control element, such as the illustrated actuatable vent flaps 16 which can control the passage of air through the HVAC system 10. Whilst singular, unitarily formed levers 14 are shown, other forms of connector could be provided, such as gear trains. In any event, the mechanical train from the actuators 12 to their respective vent flaps 16 introduces a region of mechanical play, wherein the load on the actuator 12 is reduced during movement, resulting in ineffective transfer of force. The components of the HVAC system 10 which can be moved as a result of actuation of the airflow-direction-controller actuator 12 can be considered as a nominal grouped movable member. Any or all of the movable part of the actuator 12, such as a rotor, the levers 14, and/or the vent flaps 16 can be considered to comprise part of this movable member. The total grouping of the elements forming the movable member in addition to the stationary components of the actuator 12, can be considered to comprise an airflow-direction control mechanism of the HVAC system 10.

Figure 2:
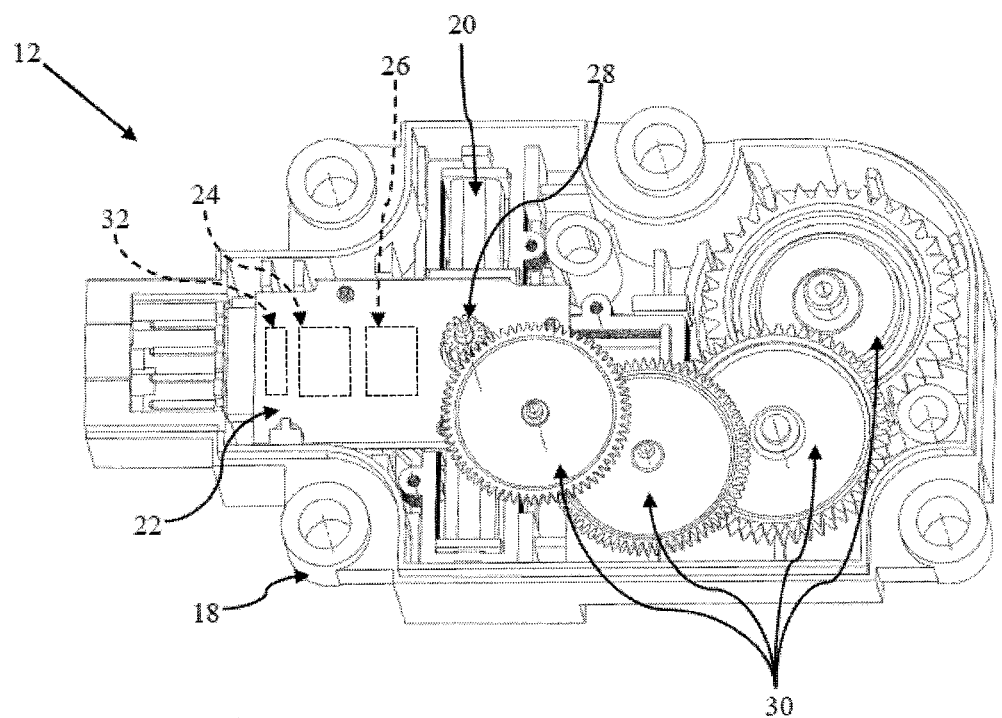
FIG. 2 shows a perspective representation of the preferred embodiment of an actuator of the HVAC system of FIG. 1.

FIG. 2 shows the actuator 12 in more detail, a cover of an actuator housing 18 having been removed to show the components therein. The actuator 12 illustrated includes a drive mechanism, preferably an electric motor 20 as shown, which can be controlled by a, preferably onboard, controller 22.

The controller 22 may include a position sensor 24, which is capable of monitoring an angular position of a rotor of the electric motor 20, and thereby allow for indirect calculation of the monitored angular position of the rotor and for determination of a target position of the vent flaps 16 in order to send control commands to the actuator 12. It will be apparent, however, that some form of position sensor 24 could be provided elsewhere in the mechanical train and/or in relation to any movable element from and including the actuator 12 to and including the vent flap 16. For instance, a position sensor 24 could be engaged with the levers 14 or the vent flaps 16 if desired. In the present embodiment, the position sensor 24 is formed as a Hall sensor capable of readily monitoring the angular position of the rotor of the electric motor 20.

The controller 22 may also include a memory circuit 26 which is capable of storing and relaying information relating to the region of mechanical play in the HVAC system 10 to the controller 22. This allows for the controller 22 to account for the mechanical play in the system when sending commands to the actuator 12.

The electric motor 20 includes an output 28 via which drive can be transferred out of the actuator 12. In the present embodiment, this output 28 comprises a toothed gear which is part of a gear train 30. Other drive transmission means may be considered, however. For example, a worm gear could be utilised in lieu of the gear train 30.

The HVAC system 10 is controllable so as to eliminate the requirement for a constant strong holding current to be provided to maintain a position of the vent flaps 16 upon deactivation or de-energisation of the actuator 12. The presence of the position sensor 24 associated with the actuator 12 allows for the position of, for instance, the rotor of the electric motor 20 to be determined at all times, potentially allowing for continuous monitoring of the position of the rotor relative to a pre-set default.

If the controller 22 is able to monitor the position of the rotor via the position sensor 24, then, upon application of a current to the electric motor 20 so as to move the rotor, the movement and changed position of the vent flaps 16 can also be monitored or inferred. This permits feedback control of the position of the vent flaps 16 to be effected.

A current monitor 32 may also be provided which is able to permit the controller 22 to monitor the current passed to the actuator 12 so as to determine the minimum current required in order to effect actuation of the vent flaps 16. This can allow the controller 22 to limit the magnitude of current passed to the actuator 12 to the minimum required, improving the efficiency of the HVAC system 10.

Figure 3:
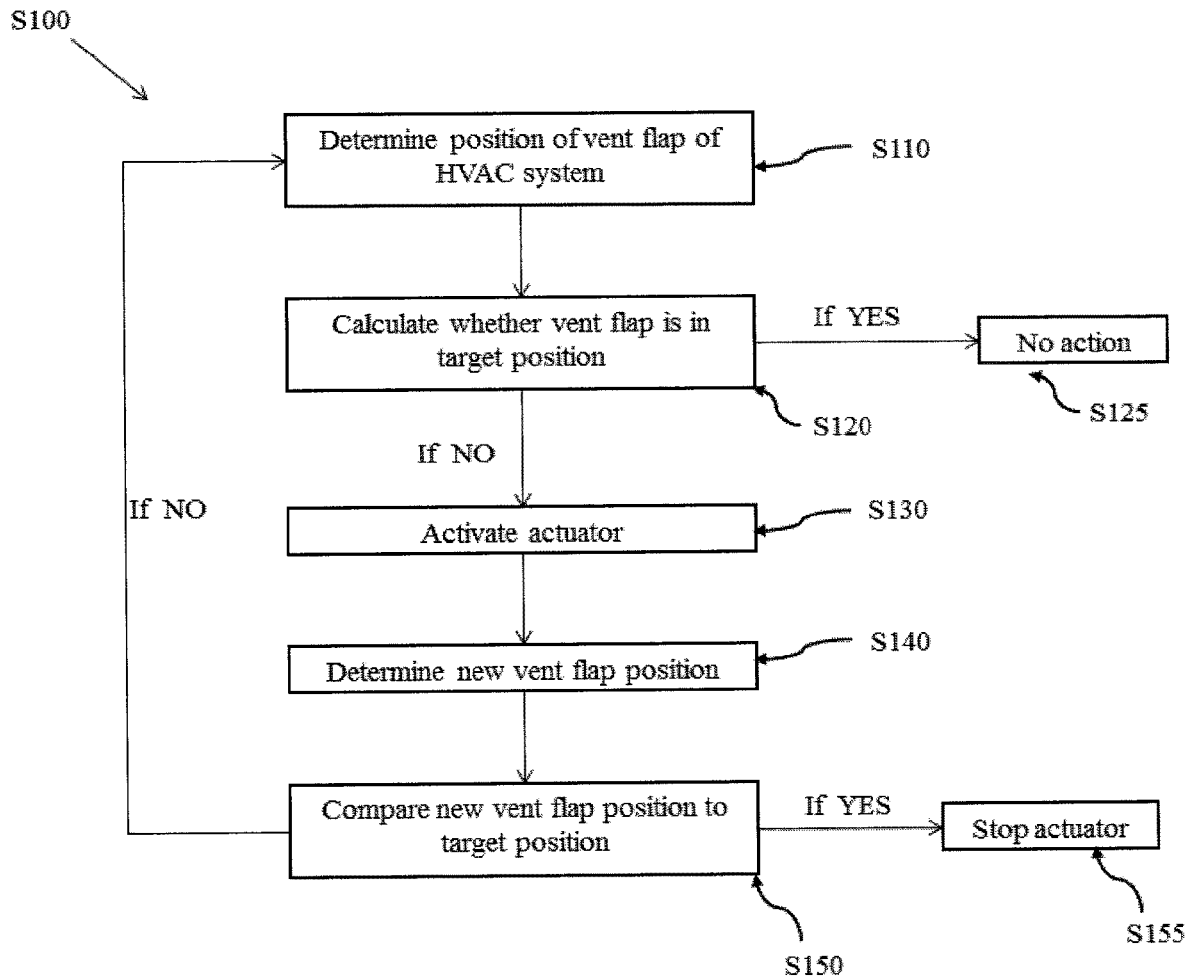
FIG. 3 shows a diagrammatic representation of the preferred embodiment of a method of controlling an actuator for a HVAC system in accordance with the first aspect of the invention.

The HVAC system 10 described is therefore capable of feedback control of the vent flap 16 positions, and therefore a high efficiency gear train can be used. The method of operation of the HVAC system 10 is illustrated in FIG. 3, indicated globally at S100.

Firstly, it is necessary to determine, step S110, a position of the or each vent flap 16 of the HVAC system 10. In the embodiment described above, this is achieved indirectly by utilising the position sensor 24 to monitoring an angular position of the rotor of the electric motor 20, from which can be calculated or inferred a vent flap 16 position. It will be appreciated, however, that direct interrogation of the position of the vent flap 16, or in fact the levers 14, could be provided.

Once the position of the vent flap 16 is known, the controller 22 can calculate, step S120, whether or not the vent flap 16 is in a target position, which may be based on internal logic of the controller 22, perhaps stored in the memory circuit 26. The target position may be set by a user interface to the HVAC system 10, potentially on the dashboard of a motor vehicle. Alternatively, the controller 22 may have automatic control of the HVAC system 10, in which case, the position of the vent flaps 16 may be fully based on internal or pre-programmed logic of the controller 22. If the position of the vent flap 16 already corresponds with that of the target position, then no action need be taken, step S125.

On the other hand, if the position of the vent flaps 16 is not that of the target position, or if the position of the vent flaps 16 is greater than a threshold amount from the target position, then the actuator 12 can be actuated, step S130, in order to effect a movement of the vent flaps 16. Where a threshold amount is referred to, this may be determined by a positional resolution of the components and/or the position sensor 24.

A current is passed to the actuator 12, here the electric motor 20, in order to effect the actuation. Where a current monitor 32 has been provided, the current may be slowly ramped until a small actuation is achieved, with the controller 22 determining a threshold current required in order to force a change in the position of the vent flaps 16. This can beneficially minimise the amount of current which must be supplied to the electric motor 20, improving the efficiency of the actuator 12.

Once the vent flap 16 has been moved, then its position can be monitored, inferred or otherwise determined, step S140, from the position sensor 24. This changed position of the vent flap 16 can then be compared, step S150, to the target position. If there is correspondence between the changed position and the target position, then the actuator 12 can be deactivated, step S155. In any other event, either because the vent flap 16 has been moved too far, insufficiently far, or in the wrong direction, then the cycle repeats and the controller 22 must re-calculate whether the vent flap 16 is in the target position, step 120, and continue from there.

Using such a method, the position of the actuator 12, and by extension the vent flaps 16, is maintained even in the event of vibrational perturbations to the position of the vent flaps 16. This allows for more efficient high-efficiency gear trains 30 to be utilised in the actuator 12, since any perturbations can be corrected by the feedback control. As such, there is no need to provide a holding current in order to maintain the vent flap 16 position. The overall effect is that the actuator 12 for the HVAC system 10 is more efficient, reducing the power drain on the system.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A method of maintaining a position of an airflow-direction control element of a HVAC system, comprising the steps of:
   a] monitoring an angular position of a rotor of an electric motor of an airflow- direction-controller actuator of the HVAC system, the airflow-direction-controller actuator comprising a reversible gear train engaged with the electric motor, and the airflow-direction control element being driven by the rotor via the reversible gear train;
   b] calculating a position of the airflow-direction control element according to the monitored angular position of the rotor;
   c] determining whether the airflow-direction control element maintains at a target position, and if not, activating the airflow-direction-controller actuator of the HVAC system to effect a change in the angular position of the rotor;
   d] monitoring the changed angular position of the rotor following actuation of the airflow-direction-controller actuator;
   e] calculating a new position of the airflow-direction control element according to the changed angular position of the rotor;
   f] comparing the new position and the target position of the airflow-direction control element, and
      i] if the airflow-direction control element is at the target position, deactivating the airflow-direction-controller actuator, otherwise
      ii] activating the airflow-direction-controller actuator of the HVAC system, and returning to the step d].

2. The method as claimed in claim 1, wherein during step a], using a position sensor to monitor the angular position of the rotor.

3. The method as claimed in claim 1, wherein during step a], using a Hall sensor to monitor the angular position of the rotor.

4. The method as claimed in claim 1, wherein the airflow-direction control element is a vent flap of the HVAC system.

5. The method as claimed in claim 1, wherein, during step c], a current to the airflow-direction-controller actuator is ramped until reaching a threshold current for forcing a change in the position of the airflow-direction control element.

6. The method as claimed in claim 5, wherein the current to the airflow-direction- controller actuator is smoothly ramped.

7. The method as claimed in claim 1, further comprising a step prior to the step c] of monitoring the current to the airflow-direction-controller actuator to determine a minimum current required to cause an actuation of the rotor.

8. The method as claimed in claim 1, wherein the monitoring of the angular position of the rotor is continuous.

9. The method as claimed in claim 1, wherein during step c], the actuator is only activated if the position of the airflow-direction control element differs from the target position by more than a threshold value.

10. A HVAC system comprising:
    an airflow-direction-controller actuator comprising an electric motor, and a reversible gear train engaged with the electric motor;
    an airflow-direction control element driven by the electric motor via the reversible gear train;
    an actuator position sensor associated with the airflow-direction-controller actuator for monitoring an angular position of a rotor of the electric motor; and
    a controller associated with the actuator position sensor, and arranged to determine whether the rotor maintains at a required angular position corresponding to a target position of the airflow-direction control element, and activate the airflow-direction-controller actuator to effect a change in the angular position of the rotor thereby bringing the airflow-direction control element to or towards the target position when the rotor does not maintain at the required angular position.

11. The HVAC system as claimed in claim 10, wherein the actuator position sensor is a Hall sensor, and the airflow-direction control element is a vent flap.

12. The HVAC system as claimed in claim 10, wherein when the controller activates the airflow-direction-controller, a current to the airflow-direction-controller actuator is ramped until reaching a threshold current for forcing a change in the position of the airflow-direction control element.

13. The HVAC system as claimed in claim 10, further comprising a current monitor arranged to monitor a current passed to the actuator.

14. A method of maintaining a position of an airflow-direction control element of a HVAC system, comprising the steps of:

a] monitoring an angular position of a rotor of an electric motor of an airflow-direction-controller actuator of the HVAC system, the airflow-direction-controller actuator comprising a reversible gear train engaged with the electric motor, and the airflow-direction control element being driven by the rotor via the reversible gear train; and b] determining whether the rotor maintains at a required angular position corresponding to a target position of the airflow-direction control element; if not, activating the airflow-direction-controller actuator to effect a change in the angular position of the rotor thereby bringing the airflow-direction control element to or towards the target position.

15. The method as claimed in claim 14, wherein the method further comprises steps following the step b] of:

c] monitoring a changed angular position of the rotor following actuation of the airflow-direction-controller actuator;

d] comparing the changed angular position of the rotor to the required angular position, and
   i] if the rotor is at the required angular position, deactivating the airflow- direction-controller actuator, otherwise
   ii] activating the airflow-direction-controller actuator of the HVAC system, and returning to the step c].

16. The method as claimed in claim 14, wherein during step b], a current to the airflow-direction-controller actuator is ramped until reaching a threshold current for forcing a change in the position of the airflow-direction control element.

* * * * *